UNITED STATES PATENT OFFICE.

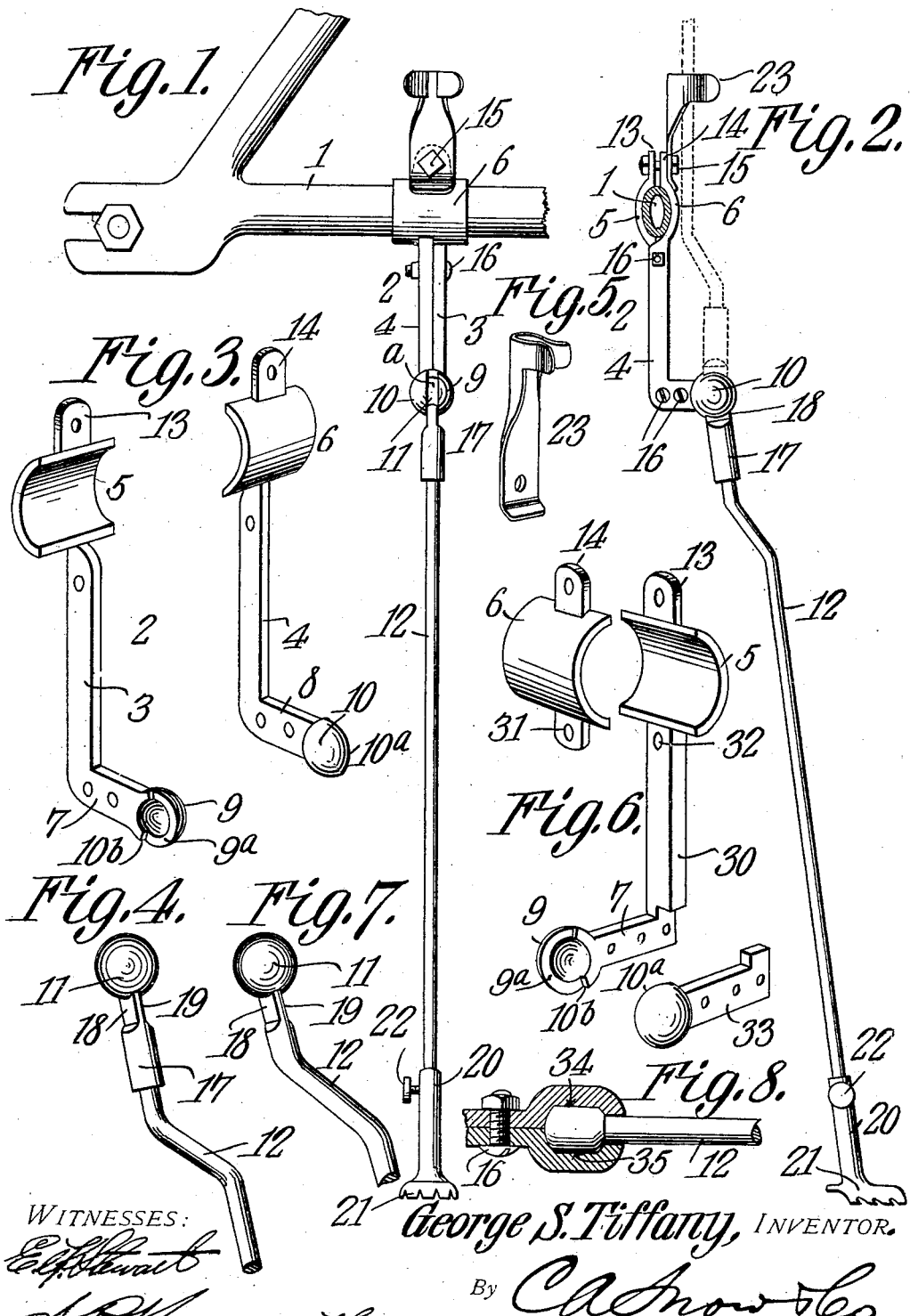

GEORGE S. TIFFANY, OF HUTCHINSON, KANSAS.

BICYCLE-SUPPORT.

No. 862,945.  Specification of Letters Patent.  Patented Aug. 13, 1907.

Application filed February 21, 1907. Serial No. 358,677.

*To all whom it may concern:*

Be it known that I, GEORGE S. TIFFANY, a citizen of the United States, residing at Hutchinson, in the county of Reno and State of Kansas, have invented a new and useful Bicycle-Support, of which the following is a specification.

This invention relates to bicycle supports, and has for its principal object to provide a simple, cheap and readily attached means to hold bicycles and similar vehicles in upright, or substantially upright position when not in use. It is the usual custom to leave vehicles of this class which are not self-supporting leaning against houses, trees, posts, curbs, and when such support is not obtainable, lying flat upon the ground, which latter position, especially in the case of power driven vehicles, such as a motor cycle, is very objectionable. To provide against such contingencies by having at hand an efficient and ready support the device now about to be described has been devised.

In the accompanying drawings:—Figure 1 is a side elevation of the device applied to a bicycle frame. Fig. 2 is a rear elevation of the same. Fig. 3 is a perspective view of the bracket disassembled. Fig. 4 is a perspective view of the standard head. Fig. 5 is a perspective view of the clamp for holding the support when not in use. Fig. 6 is a perspective view of a modified form of bracket. Figs. 7 and 8 are views of modified forms of the standard head.

Similar numerals of reference are employed to indicate corresponding parts throughout the several figures of the drawings.

The device is preferably attached to the substantially horizontal bar 1 of the rear frame of a bicycle extending from the rear axle to the pedal shaft, and comprises a bracket 2 made in two separable sections 3, 4, each section having, respectively, a curved upper end or clamp 5, 6 of such shape as to closely embrace when assembled the bar 1 of the bicycle frame.

From the curved upper ends or clamp portions 5 and 6 the sections 3, 4 extend downwardly a suitable distance and then outwardly as at 7, 8, terminating in semi-spherical ball sockets 9, 10 between which the ball head 11 of the upper end of the leg or standard 12 is seated. Up-standing lugs 13, 14 on the respective clamp portions 5, 6 are perforated to receive a screw or bolt 15 for fastening the two members of the bracket on the bicycle frame 1. Similar screws 16 unite the sections 3 and 4. The flat contacting faces of the ball sockets 9, 10 are cut away or notched at 9ª—10ª to form a narrow throat *a* when the sections are assembled, through which throat the leg or standard 12 passes. The lower portion of the throat forms a stop 10ᵇ to limit the downward movement of the leg 12 and hold it at the proper angle necessary to form an efficient support.

The leg or standard 12 is preferably made of a round rod or even stout wire, attached at its upper end to a sleeve 17 carrying a ball head 11, or if preferred the ball head may be connected directly to the standard 12, as represented in Fig. 7. The sleeve 17, or the leg 12 in the modified construction is cut away or reduced on each side at 18, 19, where it passes through the throat *a*, the object of which is to prevent the leg from turning laterally in the ball socket, and thus getting out of operative position. The lower end of the leg 12 is fitted into a long sleeve 20 on the foot piece 21, the under surface of which is roughened or provided with teeth or serrations to prevent it from slipping. The fitting may be made adjustable within certain limits. As the height of the frame bar 1 from the ground varies in different bicycles, this adjustment is found convenient. A thumb nut or screw 22 serves to unite the foot piece to the leg 12 after it has been properly seated.

In applying the device to a bicycle, the section 3 is placed with its curved upper end 5 inside the frame bar 1, and the section 4 with its curved end 6 outside said frame bar. After placing the ball head 11 between the hemi-spherical sockets 9 and 10 the sections are firmly united by the screws or bolts 16. The bracket 2 may then be moved on the frame bar 1 to the proper position and securely clamped thereon by tightening the screw or bolt 15 in the lugs 13, 14. When riding, the leg or support 12 will be turned up against the frame, as indicated by dotted lines in Fig. 2, and, if desired, is held by a spring clamp 23, such as is represented in Fig. 5, attached by the screw 15 fastening the lugs 13, 14. On turning the leg 12 to the position shown in full lines in Fig. 2, and giving the bicycle a slight inclination in the same direction, the bicycle will stand in upright position. If desired, a support similar to that shown in the drawings may be attached to each side of the bicycle, which in case of a motor cycle will be the best practice.

Instead of dividing the upright portion of the bracket 2 into two parts 3, 4, it may be constructed as illustrated in Fig. 6, wherein is shown a single upright 30 depending from the clamp section 5, its companion clamp section 6 has the lug 14 above and a similar lug 31 below, perforated for a fastening screw or bolt, to enter a threaded hole 32 in the upright 30. The ball socket 9 is on the outer end of a bar 33 having a lug on its upper rear edge adapted to fit against the part 7, carrying the other half socket 10, extending outwardly from the upright 30. These parts are held together by screws 16 as in the preferred form.

A further modification of the head of the standard 12 is shown in Fig. 8. Instead of forming a thin neck on the standard by cutting it away as at 18, 19, and thus weakening it, the slot *a* is widened to the full size of the standard and the ball head is flattened on the sides as indicated at 34, 35, and the sockets 9, 10, are shaped, accordingly, so that the ball cannot turn on the axis of the upper end of the standard.

I claim:—

1. A bicycle support comprising a two part bracket adapted to be clamped to a bicycle frame and provided with a socket having a throat opening in one side, a leg or standard having a head fitted to said socket and a neck extending through said throat, and means whereby the standard or leg is prevented from rotating on its axis in said socket but permitted to swing in one plane only.

2. A bicycle support comprising a two part bracket adapted to be clamped together and to a bicycle frame and provided with a ball socket having a narrow throat opening on one side, and a leg or standard having a ball head seated in said socket and a flattened neck passing through said throat to guide the standard and prevent it rotating in the socket.

3. A bicycle support comprising a two part bracket adapted to be clamped together and to a bicycle frame, each of said parts having a hemi-spherical ball socket with a notch in its flat face to form, when assembled a spherical socket with a narrow throat, a leg or standard having a ball head seated in said socket and provided with a flattened neck to fit said throat and prevent the standard from rotating.

4. A bicycle support comprising a two part bracket adapted to be clamped together and to a bicycle frame, each part provided with a semispherical ball socket having a notch in its flat face to form when assembled a narrow throat, a leg or standard having a ball head seated in said socket and provided with a flat neck adapted to play in said throat, and an adjustable foot piece on the lower end of said leg or standard.

5. A bicycle support comprising a two part bracket adapted to be clamped together and to a bicycle frame, a socket formed between said bracket parts and having a narrow throat opening thereinto, the lower wall of said throat serving as a stop, a leg or standard extending through the throat and provided with a head seated in said socket, and means for preventing the standard rotating on its axis.

In testimony that I claim the foregoing as my own, I have hereto affixed my signature in the presence of two witnesses.

GEORGE S. TIFFANY.

Witnesses:
BERT BLEW,
L. W. TYLER.